April 8, 1947.   H. H. TALBOYS   2,418,738
FOUNDRY CUTOFF MACHINE
Filed April 13, 1945   2 Sheets-Sheet 1
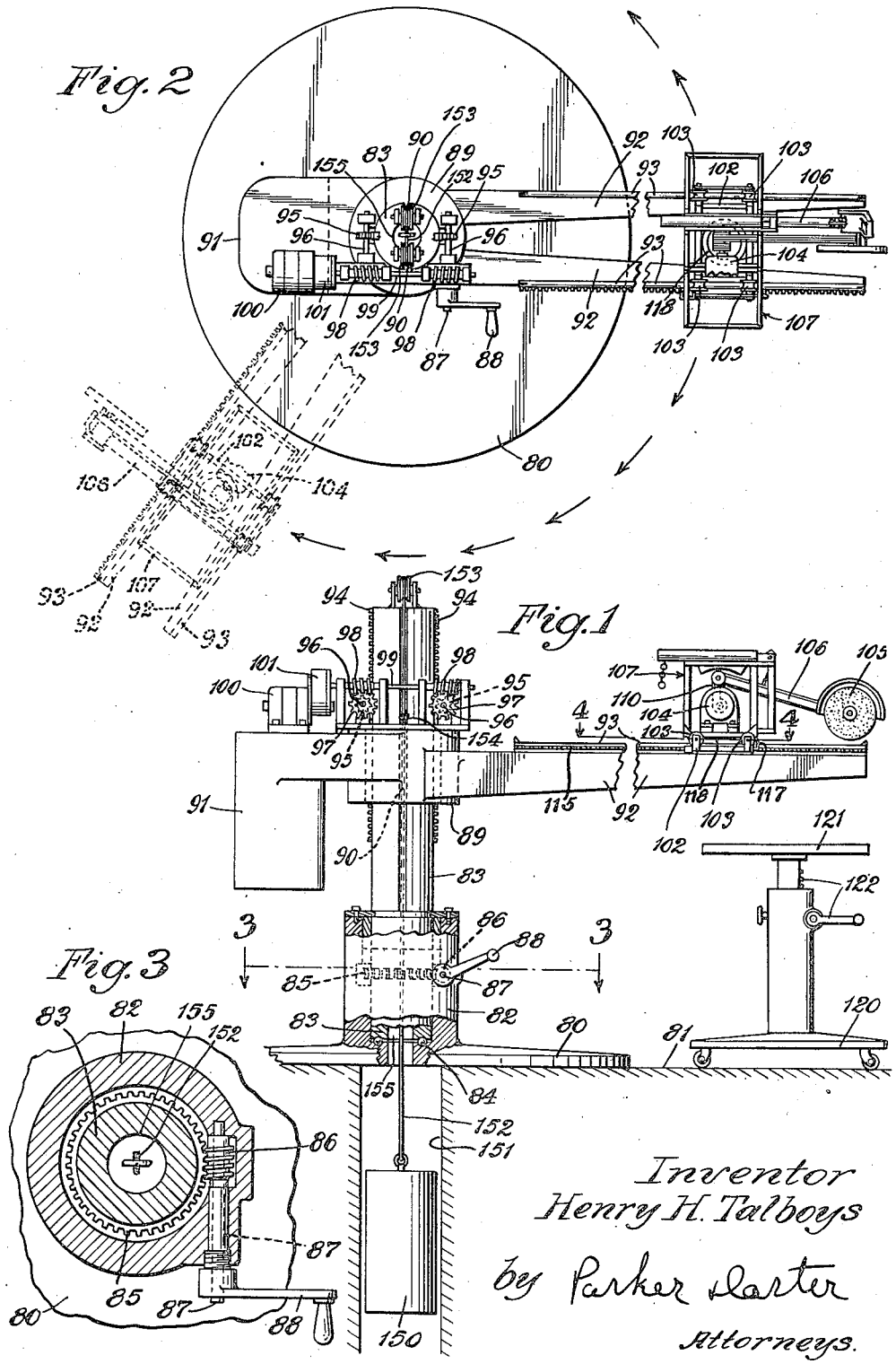
Inventor
Henry H. Talboys
by Parker & Carter
Attorneys

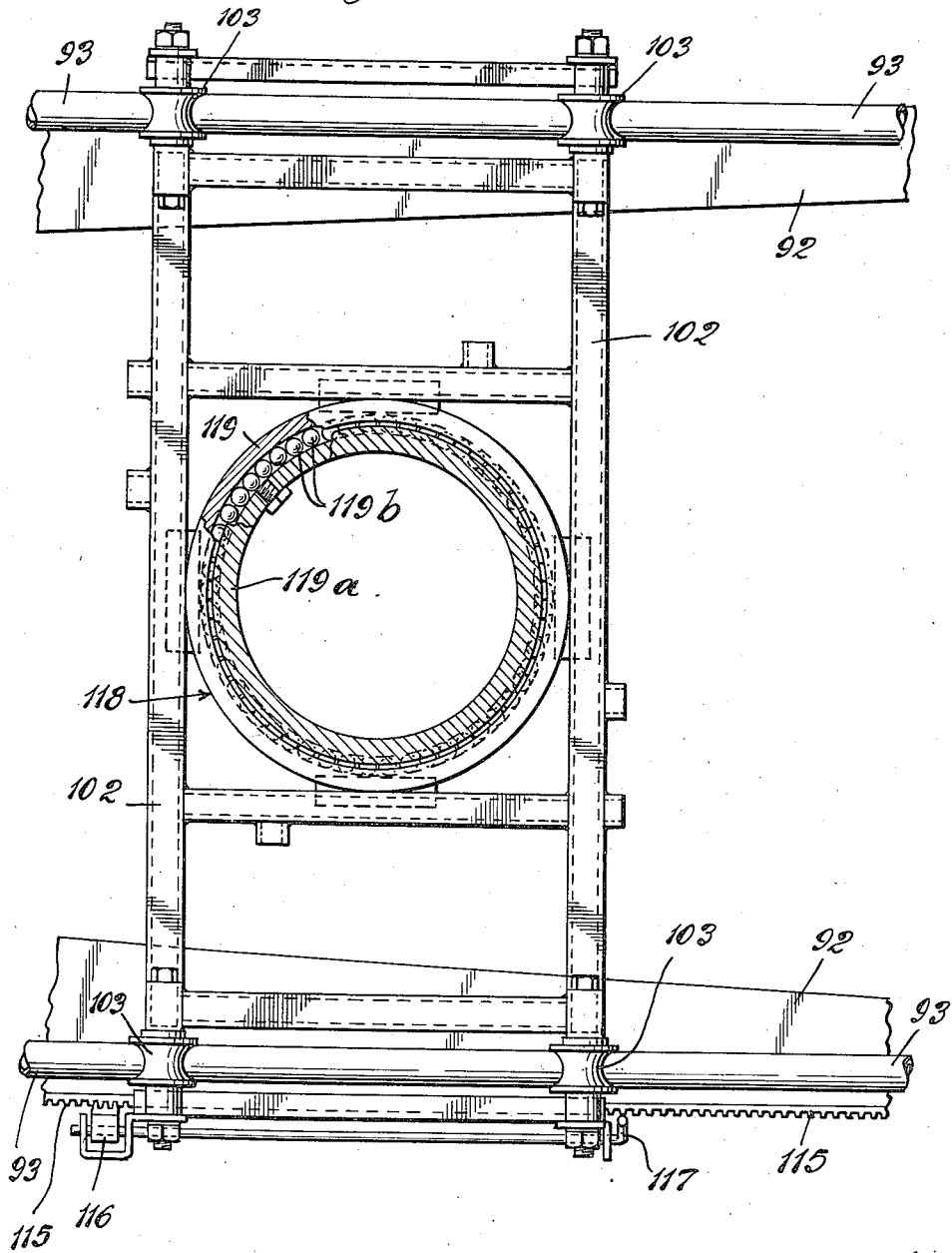

Patented Apr. 8, 1947

2,418,738

UNITED STATES PATENT OFFICE 2,418,738

FOUNDRY CUTOFF MACHINE

Henry H. Talboys, Milwaukee, Wis., assignor to Nordberg Manufacturing Company, Milwaukee, Wis., a corporation of Wisconsin Application April 13, 1945, Serial No. 588,181

9 Claims. (Cl. 51—98)

1

This invention relates to an improvement in machines for cutting articles, for example, metal castings. Another purpose of the invention is an improved method for trimming and cutting articles, for example metal castings. Another purpose is the provision of an improved installation for cutting or trimming articles, such as castings, of various sizes and shapes with maximum speed and minimum handling effort.

The present application is a continuation in part of my co-pending application 473,812 filed in the United States Patent Office on January 28, 1943, for Foundry cutoff machine and which matured as Patent No. 2,405,468, August 6, 1946.

Other purposes will appear from time to time throughout the specification and claims.

The invention is illustrated more or less diagrammatically in the accompanying drawings, wherein:

Figure 1 is a side elevation with parts in section;

Figure 2 is a plan view;

Figure 3 is a section on the line 3—3 of Figure 1;

Figure 4 is a section on an enlarged scale taken on line 4—4 of Figure 1.

Like parts are indicated by like characters throughout the specification and drawings.

Referring to the structure illustrated including main parts as follows:

80 indicates any suitable base which may rest for example on the floor surface 81. Upwardly extending from the base is a cylindrical sleeve 82 which receives a bottom portion of the rotatable vertical shaft 83. Any suitable bearing means may be provided, for example the bottom supporting rollers or balls 84. The lower portion of the shaft 83 within the sleeve 82 may be provided with any suitable means for rotating it. There is illustrated for example a circumferential angular worm gear 85 in mesh with a worm 86 on any suitable shaft 87 which may be rotated by any suitable means, for example the manually operable handle 88. It is understood that any other driving means may be employed if desired. Mounted on the shaft 83 is a vertically movable carriage 89 which may be keyed or splined as at 90 to permit it to be raised and lowered on the shaft 83 while rotation is prevented.

The carriage 89 is provided with a counterweight 91 and a pair of generally radially extending but laterally spaced arms 92 carrying parallel track rails 93. The carriage structure may be raised or lowered with or on the shaft 83 in any suitable manner. There is illustrated, however, a pair of racks 94 on the shaft 83, these racks being in mesh with pinions 95 on shafts 96 carrying worm gears 97 in mesh with worms 98 on a shaft 99 driven by any suitable motor means 100, through a gear reduction 101. This structure is illustrative of means for raising and lowering the carriage 89.

Movable along the rails 93 is a sub-carriage generally indicated as 102 which may ride, for example on wheels 103. Associated with one of the rails 93 is a rack 115 adapted to be engaged by a corresponding toothed locking member 116 pivotally mounted on the sub-carriage 102. The locking member 116 may be manually moved out of engagement with the rack 115 by means of a handle 117 and the sub-carriage may then be moved along the tracks 93. Rotatably mounted on the sub-carriage 102, by means of a turntable, generally indicated as 118 is an upwardly extending frame 107. The turntable may include, for example, an outer rail 119 mounted on the sub-carriage 102, an inner rail 119a secured to the upper structure 107, and intervening rollers or balls 119b as illustrated in Figure 4. 104 is any suitable motor which may drive the cutting element 105 mounted on an arm 106. It will be understood that the arm 106 is mounted at its inner end on an upwardly extending link 110 and that any suitable drive may extend from the motor 104, along the link 110 and the arm 106 to the cutting element 105. Thus the cutting element may be traversed toward and away from the motor, or may be raised and lowered, without interfering with the driving connection. The upwardly extending frame 107 includes portions which may assist in guiding the arm 106.

In the use of the device the shaft 83, including the arm 92, may be rotated through a complete cricle by use of the crank handle 88. The carriage 89 may be raised and lowered vertically in relation to the base 80. The sub carriage 102 may be moved toward and away from the vertical axis of the shaft 83. The motor 104 and the cutter 105 may be rotated bodily on the carriage 102 about a vertical axis. The cutter may be traversed toward and away from said axis and may be raised and lowered.

Any suitable work supporting means may be employed for supporting the work at various points about and along the vertical axis of rotation of the cutting assembly, and at various levels in relation to the base or supporting surface.

In order to reduce the work of the motor and to render it easier to raise and lower the arm 92, I may provide a suitable counter balancing means. As an example, I illustrate a counterweight 150 which may move in a pit 151. It may be supported upon flexible members 152 which pass about pulleys 53 and are dead ended as at 154 on the carriage 89. The shaft 83 is provided with any suitable hollow 155 to permit the passage of the members 152.

It will be realized that while I have shown and described an operating device, still many changes in the size, shape, arrangement, number and disposition of parts may be made without departing materially from the spirit of my invention. I wish, therefore, that the showing be taken as in a large sense illustrative and diagrammatic rather than as limiting me to my precise showing.

The use and operation of the invention are as follows:

There is provided herein a method of and an apparatus for trimming or cutting metal parts, for example, castings, which permits of the rapid trimming of a large number of parts and the use of a substantial area for the receiving, operating upon and removal of the trimmed parts.

If the split arm 92 is located near the floor level, articles mounted directly upon the floor 81 may be operated upon by the cutter 105. Since the arm is split, the cutter, when in the position in which it is shown in the drawings, may operate directly downwardly against articles vertically aligned with the arm structure 92. The arm 92 may be rotated to any desired position about its arc of rotation of 360 degrees. A variant position is shown in dotted line in Figure 2. The turntable with the motor on it may be rotated, to place the cutter 105 out of vertical alignment with the arm 92. It is so shown in the dotted line portion of Figure 2.

It will be understood, of course, that the structure of the drawings may be varied without departing from the spirit of the invention. What is important is that means are provided (a) for raising and lowering the cutter structure as a whole; (b) for rotating the cutter structure as a whole about a vertical axis; (c) for moving the cutter structure as a whole radially toward and away from such axis; and (d) for rotating the cutter structure and motor about the vertical axis parallel to the axis of the shaft 83 but adjustable toward and away from it, for example by movement of the sub-carriage 102. The frame 114 being transversely movable on the sub-carriage 102, and carrying the motor 104 on a turntable structure, provides a maximum flexibility in the angle and point of possible application of the member 105 to the work.

The result is the provision of a flexible and efficient means for cutting parts, for example of metal, arranged over a substantial floor area and located at various levels on the floor area.

The details of the supporting mechanism for the work may be widely varied, and are not shown herein in great detail. However, I indicate in Figure 1 a supporting structure upon which articles to be operated upon may be positioned, the supporting structure including a base 120, a top supporting surface 121 and elevating means 122, whereby it may be elevated to any suitable height above the floor. The base 120 is so arranged that the support may be bodily moved and placed at any desired location about the base 80.

The balance weight 150 which travels in the cylindrical pit 151 is effective to reduce the reaction on the worm and gear drive necessary to raise and lower the carriage 89 with its arm 92. The weight is supported on the two cables 152 which pass down through a central bore in the column 83 and are passed over the top pulleys 153. In the dusty atmosphere found in a foundry and particularly a mechanism which is in line with a cutting tool, such as the disk 105, lightening the work on the worms 98 becomes important because they are likely to be sprayed with gritty abrasive material. The arm 92 and the counterbalance 91 are only partially balanced so that there will be a downward resultant weight which tends to steady the mechanism as the wheel 105 is pushed through or down against a casting which is to be trimmed. In this way, the effect of any looseness or play in the hub in relation to the column 83 is neutralized.

I claim:

1. In a castings trimmer, a base, an elevator mounted on said base, a radially extending carriage track mounted on said elevator and rotatably adjustable about the axis of the base, a carriage radially movable on said track, a turntable on said carriage, a cutter supporting arm mounted on said turntable for rotation about a generally horizontal axis, a horizontally axised rotary cutter on said arm and means for driving it, and means for supporting the castings to be trimmed.

2. In a castings trimmer, a base, a pair of parallel generally horizontal rails on said base, a carriage longitudinally movable on said rails, a turntable rotatably mounted on said carriage, an arm mounted on said turntable for rotation about a horizontal axis, a horizontally axised cutter, rotatably mounted on said arm and means for actuating it and means for supporting the castings to be trimmed.

3. In a castings trimmer, a base, a pair of parallel generally horizontal rails on said base, a carriage longitudinally movable on said rails, a turntable rotatably mounted on said carriage, an arm mounted on said turntable for rotation about a horizontal axis, a horizontally axised cutter, rotatably mounted on said arm and means for actuating it and means for supporting the castings to be trimmed, said supporting means being located between said rails.

4. In a castings trimmer, a base, a pair of parallel generally horizontal rails on said base, a carriage longitudinally movable on said rails, a turntable rotatably mounted on said carriage, an arm mounted on said turntable for rotation about a horizontal axis, a horizontally axised cutter, rotatably mounted on said arm and means for actuating it and means for supporting the castings to be trimmed, and including means for supporting the castings to be trimmed in a plurality of positions.

5. In a castings trimmer, a base, a pair of parallel generally horizontal rails on said base, a carriage longitudinally movable on said rails, a turntable rotatably mounted on said carriage, an arm mounted on said turntable for rotation about a horizontal axis, a horizontally axised cutter, rotatably mounted on said arm and means for actuating it and means for supporting the castings to be trimmed, said supporting means being located between said rails, and including means for supporting the castings to be trimmed at a plurality of levels.

6. In a castings trimmer, a base, a carriage, means for bodily raising and lowering said carriage in relation to said base, means for rotating said carriage bodily about a generally upright axis from which the carriage is radially removed and a cutting assembly mounted on said carriage and means for generally radially adjusting said cutting assembly toward and away from the axis of rotation of said carriage, said cutting assembly including an arm rotatable freely about generally horizontal and generally vertical axes.

7. In a castings trimmer, a base, an elevator mounted on said base, a radially extending carriage track mounted on said elevator and rotatably adjustable about the axis of the base, a carriage radially movable on said track, a turntable on said carriage, a cutter supporting arm mounted on said turntable for rotation about a generally horizontal axis, a horizontally axised rotary cutter on said arm and means for driving it, means for supporting the castings to be trimmed and counterweight means for said elevator.

8. In a castings trimmer, a base, an elevator mounted on said base, a radially extending carriage track mounted on said elevator and rotatably adjustable about the axis of the base, a carriage radially movable on said track, a turntable on said carriage, a cutter supporting arm mounted on said turntable for rotation about a generally horizontal axis, a horizontally axised rotary cutter on said arm and means for driving it, means for supporting the castings to be trimmed and counterweight means for said elevator including a pit aligned with said elevator, a counterweight movable in said pit and a flexible connection between said counterweight and said elevator.

9. In a castings trimmer, a base, a generally upright hollow shaft rotatably mounted on said base and means for rotating it, an elevator on said shaft and means for raising and lowering it, counterweight means for said elevator including a counterweight positioned in a pit generally vertically aligned with said base, a flexible connection between said counterweight and said elevator extending through the hollow of said shaft, pulley means for said flexible connection located adjacent the top of said shaft, and a castings cutting member and means for actuating it, said member being movable generally radially on said elevator, toward and away from said shaft.

HENRY H. TALBOYS.

REFERENCES CITED

The following references are of record in the file of this patent:

UNITED STATES PATENTS

| Number | Name | Date |
|---|---|---|
| 1,640,832 | Jacobowitz | Aug. 30, 1927 |
| 1,620,466 | Jones | Mar. 8, 1927 |